United States Patent [19]

Yamaguchi et al.

[11] Patent Number: 5,064,331
[45] Date of Patent: Nov. 12, 1991

[54] VERTICAL CONVEYING APPARATUS

[75] Inventors: Hitoshi Yamaguchi; Keiji Andoh, both of Kawasaki, Japan

[73] Assignee: Fuji Electric Co., Ltd., Kawasaki, Japan

[21] Appl. No.: 514,395

[22] Filed: Apr. 25, 1990

[30] Foreign Application Priority Data

May 8, 1989 [JP] Japan .................................. 1-14806

[51] Int. Cl.[5] ............................................ B65G 67/02
[52] U.S. Cl. ..................... 414/344; 104/131; 104/292; 414/391; 414/399; 414/609
[58] Field of Search ............... 414/340, 344, 345, 354, 414/391, 399, 609; 198/619; 104/35, 131, 127–129, 290, 292

[56] References Cited

U.S. PATENT DOCUMENTS

| 1,178,498 | 4/1916 | Cull ...................................... 414/399 |
| 1,202,163 | 10/1916 | Coan ..................................... 414/399 |
| 2,693,770 | 11/1954 | Hubscher ........................... 104/35 X |
| 3,827,365 | 9/1974 | Coppel ............................. 104/131 X |
| 3,896,736 | 7/1975 | Hamy ............................... 104/131 X |
| 4,817,533 | 4/1989 | Azukizawa et al. ............. 104/290 X |
| 4,919,054 | 4/1990 | Matsuo .............................. 104/292 X |
| 4,931,677 | 6/1990 | Heidelberg et al. ............. 104/292 X |

FOREIGN PATENT DOCUMENTS

| 2741957 | 3/1978 | Fed. Rep. of Germany ...... 414/391 |
| 3536541 | 4/1987 | Fed. Rep. of Germany ...... 414/399 |
| 3620714 | 12/1987 | Fed. Rep. of Germany ...... 104/127 |

Primary Examiner—David A. Bucci
Attorney, Agent, or Firm—Townsend and Townsend

[57] ABSTRACT

A vertical conveying apparatus for vertically conveying an article between at least two horizontal surfaces having different vertical positions, includes a plurality of vertical tracks, vertical conveying trucks, horizontal conveying trucks, and coupling units. The vertical tracks couple the horizontal surfaces to each other. The vertical conveying trucks are capable of vertically moving along the vertical tracks. The horizontal conveying trucks are capable of moving on the horizontal surfaces. The coupling units are respectively arranged on the horizontal surfaces, and transfer the article between the vertical and horizontal conveying trucks. Each vertical track serves, throughout the entire length, as a primary side of a linear motor. The primary side is vertically divided into a plurality of sections. The sections are connected to power sources which can be independently controlled in units of sections. The vertical conveying truck serves as a secondary side of the linear motor.

11 Claims, 3 Drawing Sheets

VERTICAL CONVEYING APPARATUS

BACKGROUND OF THE INVENTION

1. Field of the Invention

The present invention relates to a vertical conveying apparatus for conveying a large quantity of articles between facilities constructed underground at a great depth and the ground at high speed.

2. Description of the Prior Art

The use of underground spaces at great depth has been examined as a drastic measure to solve various problems posed in densely-populated areas such as large cities. In order to transport articles such as mails between a subway constructed at a depth of several tens meters and the ground, a high-speed transportation means capable of transporting a large quantity of articles is required. Since transportation is performed between positions having a great level difference, a vertical conveying means such as an elevator is suitable for this transportation means.

Elevators have been widely used as vertical conveying apparatuses. Of the elevators, elevators of a hoisting system are used for vertical conveyance of vehicles in three-dimensional parking lots.

Elevators which are used between positions having great level differences can be driven at high speed. However, since only one conveyor can be arranged in one elevator, a convey capacity per elevator is not large. Therefore, in order to transport a large quantity of articles, a large number of elevators must be installed as in a practical case.

In an elevator of a hoisting system, as used in a three-dimensional parking lot, a large number of conveyors can be arranged. However, since all the conveyors are simultaneously stopped at every time when articles are loaded or unloaded in or from one conveyor, a traveling/stopping operation must be frequently performed, and the maximum speed of the elevator is undesirably limited. In addition, since the ratio of a stopping time to a traveling time is increased, the average traveling speed is decreased. Consequently, even in this system, a convey capacity per conveyor cannot be set to be large.

In the hoisting system, when loading/unloading is to be performed, a conveying truck may be disconnected from a traveling unit so as not to stop other conveying trucks. Such a system is employed in a ropeway. If, however, this system is applied to a vertical conveying apparatus, a high-speed operation is difficult to perform, and a complicated structure is required to detachably mount a conveying truck on a traveling unit. Hence, this system is difficult to realize.

As described above, in the vertical conveying apparatuses of the conventional systems, since a convey capacity per apparatus cannot be increased, a plurality of apparatuses must be arranged to achieve a large convey capacity. In this case, a large space is occupied by the vertical conveying apparatuses, and a large excavation volume is required. Therefore, an enormous cost is required to ensure a space for installing conveying apparatuses. In addition, since a large area of the ground is also occupied, a land having a high price must be ensured at high cost.

SUMMARY OF THE INVENTION

It is an object of the present invention to provide a vertical conveying apparatus which can convey a large quantity of articles by itself.

In order to achieve the above object, there is provided a vertical conveying apparatus for vertically conveying an article between at least two horizontal surfaces having different vertical positions, comprising a plurality of vertical tracks for coupling the horizontal surfaces to each other, vertical conveying trucks capable of vertically moving along the vertical tracks, horizontal conveying trucks capable of moving on the horizontal surfaces, and coupling units, respectively arranged on the horizontal surfaces, for transferring the article between the vertical conveying trucks and the horizontal conveying trucks, wherein each of the vertical tracks serves, throughout the entire length, as a primary side of a linear motor, the primary side is vertically divided into a plurality of sections, the sections are connected to power sources which can be independently controlled in units of sections, and the vertical conveying truck serves as a secondary side of the linear motor.

DETAILED DESCRIPTION OF THE PREFERRED EMBODIMENTS

Figure 1:
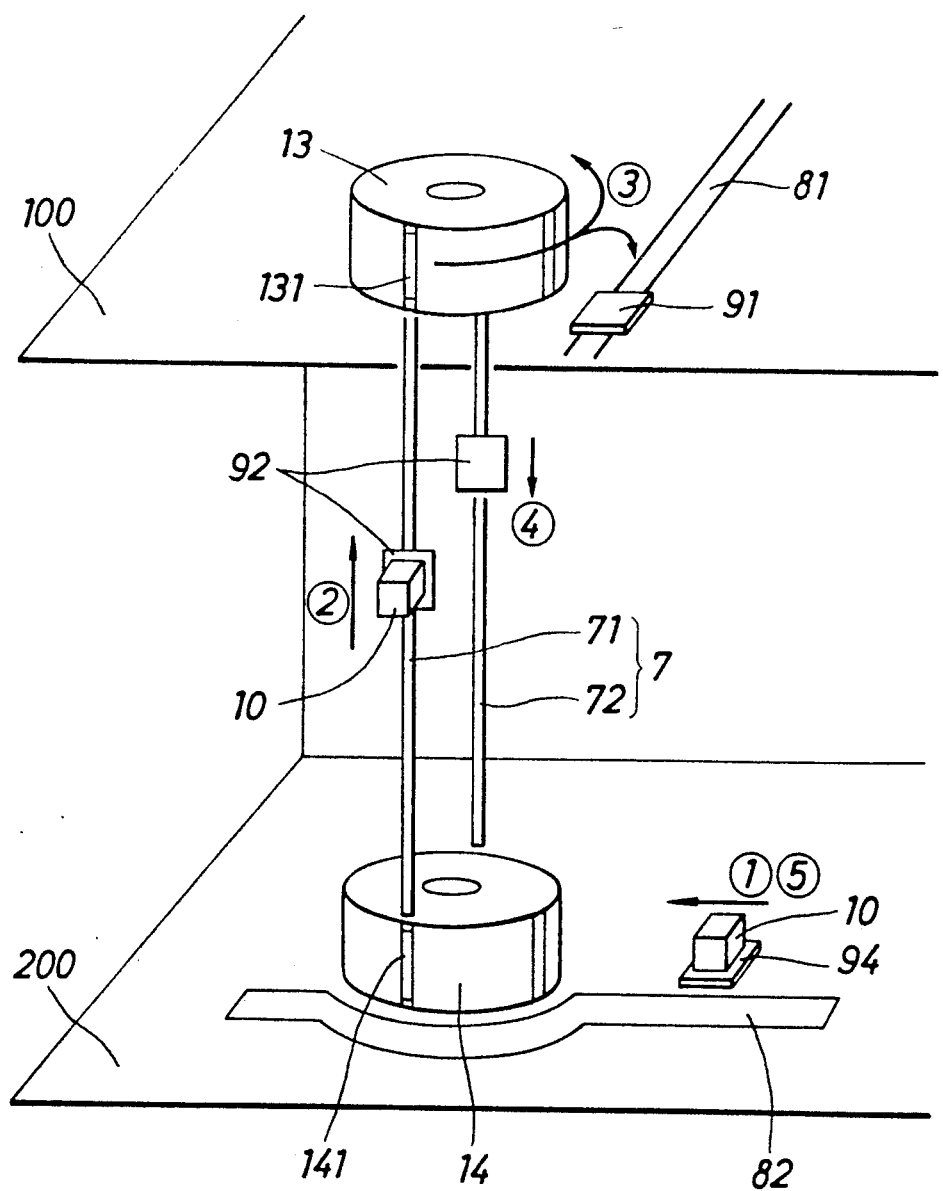
FIG. 1 is a perspective view showing a schematic arrangement of a vertical conveying apparatus according to an embodiment of the present invention.

An embodiment of the present invention will be described below. FIG. 1 is a perspective view illustrating a vertical conveying apparatus according to an embodiment of the present invention. Referring to FIG. 1, a vertical track 7 constituted by two tracks, i.e., ascending and descending tracks 71 and 72 is arranged between two horizontal surfaces 100 and 200. On the horizontal surface 100, a coupling unit 13 and a horizontal conveying truck 91 which travels on a horizontal track 81 are arranged. On the horizontal surface 200, a coupling unit 14 and a horizontal conveying truck 94 which travels on a horizontal track 82 are arranged. In a state shown in FIG. 1, a vertical conveying truck 92 on which a container 10 as an article to be conveyed is mounted is ascending on the ascending track 71, and a vertical conveying truck 92 on which no article is mounted is descending on the descending track 72. Although a plurality of vertical conveying trucks can simultaneously travel on each of the ascending and descending tracks 71 and 72, FIG. 1 shows only one vertical conveying truck on each track for the sake of simplicity.

The container 10 is conveyed from the horizontal surface 200 to the horizontal surface 100 in accordance with the following sequence. Note that numbers in circles in FIG. 1 respectively correspond to the following numbers representing the operations of the sequence:

① The container 10 is placed on the horizontal conveying truck 94, and is moved to the position of the ascending track 71 of the coupling unit 14.

② The container 10 is transferred to the vertical conveying truck 92 attached to the ascending track 71. The vertical conveying truck 92 is moved onto the ascending track 71 by controlling a driving portion 141 constituting the primary side of a linear motor arranged in the coupling unit 14. The vertical conveying truck 92 is then accelerates to travel upward by driving and controlling the primary side of a linear motor (to be described later) for the ascending track 71.

③ When the vertical conveying truck 92 reaches the coupling unit 13, a driving portion 131 is controlled to rotate the coupling unit 13 to move it to the position of the horizontal conveying truck 91 while the vertical conveying truck 92 is held at the above coupling unit 13, and to transfer the container 10 onto the horizontal conveying truck 91.

④ After the container 10 is unloaded from the vertical conveying truck 92, the coupling unit 13 is further rotated to move the vertical conveying truck 92 onto the descending track 72. The vertical conveying truck 92 travels downward on the descending track 72 and returns to the horizontal surface 200.

⑤ A new container 10 is transferred from the horizontal conveying truck 94 onto the vertical conveying truck 92. The vertical conveying truck 92 then travels upward to the horizontal surface 100 again.

By reciprocating a single vertical conveying truck between the horizontal surfaces 100 and 200 in such a sequence, articles on the horizontal surface 200 can be successively conveyed to the horizontal surface 100. Since accelerated travel or constant-speed travel of the vertical conveying truck 92 which travels on the vertical track 7 can be performed regardless of vertical conveying trucks which are stopped at the positions of the coupling units 13 and 14 so as to transfer the containers 10, the traveling speed of the vertical conveying truck 92 can be increased with an increase in distance between the horizontal surfaces 100 and 200, as with the case of an elevator.

Figure 2:
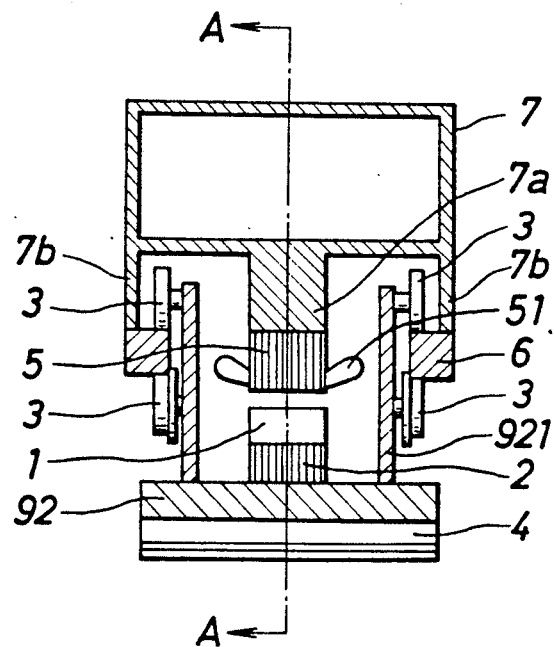
FIG. 2 is a horizontal sectional view of a vertical track and a vertical conveying truck used in the vertical conveying apparatus in FIG. 1.

FIG. 2 is a horizontal sectional view showing one track of the vertical track 7 and the vertical conveying truck 92. Referring to FIG. 2, the vertical track 7 has a projection 7a to which a primary yoke 5 and a primary winding 51 are attached, and projections 7b, formed on both the sides of the projection 7a, for holding two guide rails 6 on both the sides of the track 7.

A secondary field pole consisting of a secondary yoke 2 and permanent magnets 1 constituting a secondary side is attached to the center of the vertical conveying truck 92 so as to oppose the primary side of the vertical track 7. Wheel mounting plates 921 extend from both the sides of the secondary field pole. FIG. 2 shows two wheels 3 respectively mounted on each plate 921. These wheels 3 clamp the guide rails 6 so as to restrict the vertical movement (in FIG. 2) of the vertical conveying truck 92. In addition, collars are formed on the lower wheels in order to restrict the lateral movement (in FIG. 2) of the truck 92. Since the vertical and lateral directions in FIG. 2 correspond to horizontal directions with respect to the vertical track 7 in practice, the horizontal movement of the vertical conveying truck 92 is restricted.

Figure 3:
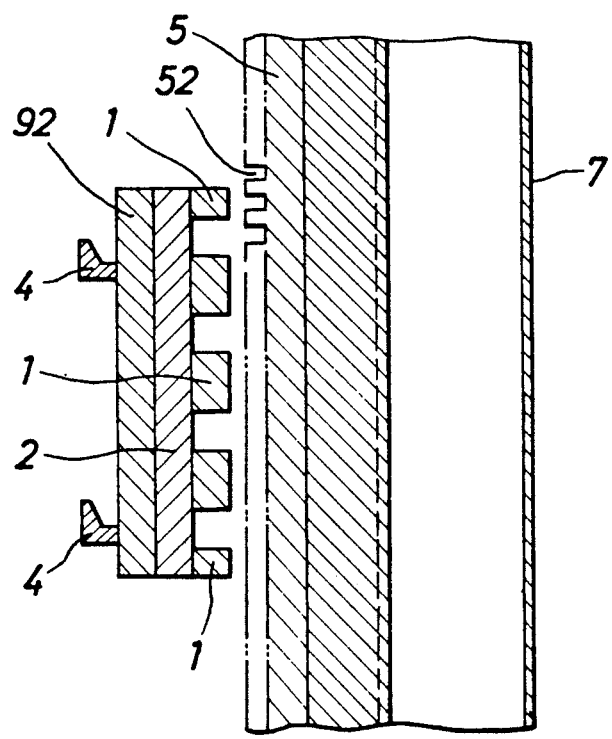
FIG. 3 is a sectional view taken along a line A—A in FIG. 2.

FIG. 3 is a sectional view taken along a line A—A in FIG. 2. Referring to FIG. 3, grooves 52 are formed in the primary yoke 5 as in the armature core of a normal linear motor, and the primary winding 51 shown in FIG. 2 is accommodated in the grooves. In FIG. 3, the primary winding 51 is omitted, and only some grooves 52 are shown.

The yoke 2 and five permanent magnets 1 as a secondary field pole are attached to the vertical conveying truck 92. The poles of the adjacent permanent magnets 1 have opposite polarities. The end permanent magnets on the yoke 2 are designed to have a width $\frac{1}{2}$ that of other permanent magnets.

Since a linear synchronous motor is employed in this case, the pole pitch of the primary winding is the same as that of the permanent magnets, and a current having a frequency proportional to the traveling speed of the vertical conveying truck 92 flows in the primary winding. Therefore, while the vertical conveying truck 92 is stopped, a DC current flows in the primary winding 51. During acceleration of the truck 92, the frequency of the current is controlled to be increased in proportion to the speed of the truck 92. Such a control system can be easily realized by using an inverter.

The Driving portions 131 and 141 of the coupling units 13 and 14 respectively have the same arrangements as those of the primary winding and the primary yoke constituting the primary side of the vertical track 7. The driving portions 131 and 141 are respectively driven, as divided sections, by independent power sources.

Hooks 4 are formed on the side of the vertical conveying truck 92 opposite to the vertical track 7. The hooks 4 are used to load or unload the container 10 in or from the vertical conveying trucks, as will be described later.

Figure 4:
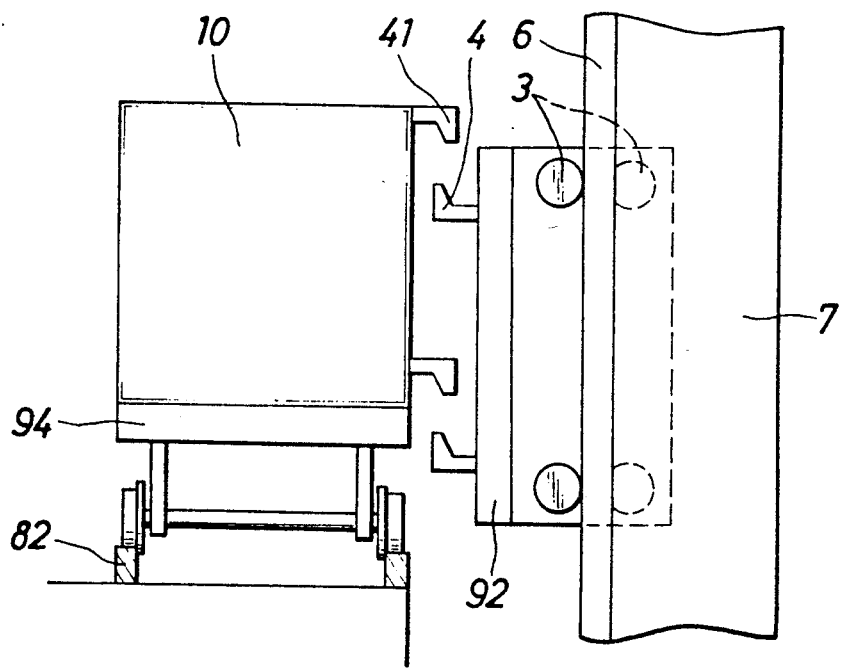
FIGS. 4 and 5 are partial elevations showing a horizontal conveying truck, a vertical conveying truck, and a vertical track in FIG. 1.

FIG. 4 is an elevation showing part of the horizontal conveying truck 94 and of the vertical track 7. In a state shown in FIG. 4, the horizontal conveying truck 94 travels on the horizontal track 82, and the container 10 is mounted on the horizontal conveying truck 94. Hooks 41 are formed on the container 10. FIG. 4 shows a state wherein the hooks 4 of the vertical conveying truck 92 are located below the corresponding hooks 41.

Figure 5:
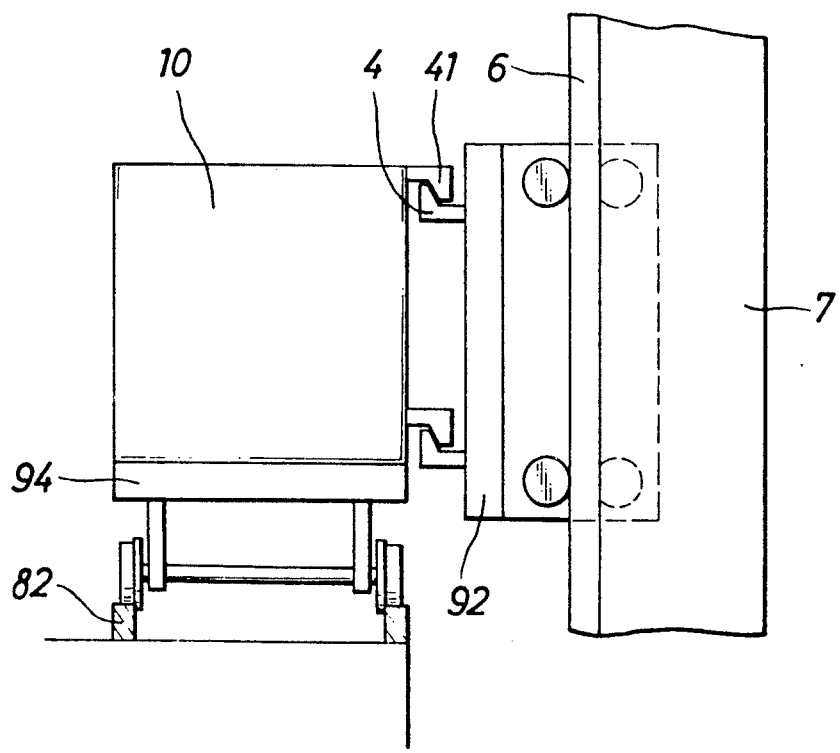

FIG. 5 is an elevation showing part of the horizontal conveying truck 94 and of the vertical track 7. FIG. 5 shows a state wherein the vertical conveying truck 92 is moved upward, and the hooks 4 are brought into contact with the hooks 41 of the container 10. If the vertical conveying truck 92 is further moved upward, the container 10 is transferred from the horizontal conveying truck 94 onto the vertical conveying truck 92.

In contrast to this, if the vertical conveying truck 92 is moved downward from the state shown in FIG. 5, the container 10 is transferred from the vertical conveying truck 92 onto the horizontal conveying truck 94.

In this manner, the container 10 can be transferred between the vertical and horizontal conveying trucks 92 and 94 upon vertical movement of the vertical conveying truck 92 and engagement/disengagement of the hooks 4 and 41.

The primary winding of the linear motor arranged on the vertical track 7 is divided into a plurality of sections in the longitudinal direction of the track 7, and the sections are respectively connected to independent power sources. With this arrangement, a plurality of vertical conveying trucks 92 can be caused to simultaneously travel on the single vertical track 7. That is, even during acceleration of one vertical conveying truck 92, constant-speed travel or deceleration of other vertical conveying trucks 92 can be performed. In this case, such an operation is based on the assumption that these vertical conveying trucks 92 with different travel states travel on different sections of the primary winding 51 of the vertical track 7, the sections must be formed at least at the following three positions: both the ends of the vertical track 7, at which acceleration or deceleration is performed, and the central portion at which constant-speed travel is performed. An optimal system is employed in consideration of the length of the vertical track 7, the rate and time of acceleration and deceleration, necessity of independent control of the vertical conveying trucks 92 in a constant-speed travel range, and the like.

In the above embodiment, the permanent magnets are used as a field pole attached to the vertical conveying truck 92. However, the system of supplying a DC current to a coil wound around a field core cannot be properly applied to the present invention. This is because a complicated arrangement is required to supply a DC current to the vertical conveying truck 92. Since the secondary side of a linear induction motor can be constituted by only a secondary yoke and a secondary conductive member, the constitution of this secondary side can be applied to the present invention. An optimal system of a linear motor is employed in accordance with the specifications of an actual vertical conveying apparatus, such as a traveling speed and the weight of the container 10.

FIG. 1 shows only the two horizontal surfaces 100 and 200, which respectively correspond to a surface on the ground and an underground surface in a case wherein facilities are constructed at a great depth. If another underground installation is present between these horizontal surfaces, three horizontal surfaces must be taken into consideration. However, the present invention can be applied to such a case or a case wherein more than three horizontal surfaces are present. In this case, coupling units are respectively arranged on the horizontal surfaces, vertical tracks are respectively arranged between the adjacent horizontal surfaces so as to couple the coupling units to each other, and the vertical tracks between the different horizontal surfaces may have a coupling function for allowing each vertical conveying truck to continuously travel through the coupling units. In this case, the arrangement of each coupling unit itself need not be substantially changed from that shown in FIG. 1.

The coupling units 13 and 14 in FIG. 1 are designed to change their horizontal positions by rotation. However, a linear movement system may be employed. In addition, the horizontal conveying trucks 91 and 94 are designed to travel on the horizontal tracks 81 and 82. However, a system without the horizontal tracks 81 and 82 may be employed. Whether to arrange the horizontal tracks 81 and 82 is to be determined in consideration of a moving system on a single horizontal surface, easiness in a transfer operation, and the like.

The two vertical tracks 71 and 72 need not be exclusively used for ascending and descending movements. The linear motor is required to generate a force enough to support the sum of the weights of an article or articles to be conveyed and a vertical conveying truck. This force can be represented by an acceleration as about 10 m/sec$^2$ which corresponds to the acceleration of gravity. In practice, an acceleration or deceleration of about 1 m/sec$^2$ is generated when a vertical conveying truck is vertically moved. Therefore, the force due to the acceleration of 11 m/sec$^2$ must be generated upward for an ascending vertical track, and at least 10 m/sec$^2$ must be generated upward for a descending vertical track so as to maintain a stationary state of the truck. There is no great difference between the accelerations for the ascending and descending tracks. Therefore, the two vertical tracks need not be exclusively used for ascending or descending movements. One of them may be used for ascending movement, and the other may be used for descending movement. Both of them may be used for ascending movement or descending movement as needed, thus facilitating maintenance and inspection.

As has been described above, according to the present invention, a plurality of horizontal surfaces having different horizontal positions are coupled to each other through a plurality of vertical tracks. The primary side of a linear motor is formed along the entire length of each vertical track. The primary side is vertically divided into a plurality of sections. These sections are respectively connected to power sources which can be independently controlled. A vertical conveying truck on which the secondary side of the linear motor is arranged is movably mounted on the vertical track. With this arrangement, a plurality of vertical conveying trucks can be simultaneously and independently controlled to travel on a single vertical track. In addition, coupling units capable of horizontally moving vertical conveying trucks are respectively arranged on the horizontal surfaces so as to transfer a vertical conveying truck between different vertical tracks, and to transfer an article between a vertical conveying truck and a horizontal conveying truck. With this arrangement, an article to be conveyed which is placed on a horizontal conveying truck on one horizontal surface can be transferred onto a horizontal conveying truck on another horizontal surface through a vertical conveying truck.

Since a plurality of vertical conveying trucks can be simultaneously and independently controlled to travel on a single vertical track, even if a vertical conveying truck is stopped for a transfer operation, other conveying trucks can freely travel. Therefore, the traveling speed of each vertical conveying truck can be increased, and a plurality of vertical conveying trucks can travel on a single vertical track, as described above. This leads to an increase in convey capacity per vertical conveying truck. Since the number of vertical conveying trucks required to ensure a predetermined convey capacity can be decreased, only a small installation space is required. If, therefore, the present invention is applied to facilities constructed underground at a great depth, the construction cost of a vertical conveying apparatus can be reduced with a reduction in excavation amount of a vertical tunnel, and the purchase price of a land can be decreased with a reduction in occupied area on the ground.

In addition, since a linear motor is used as a driving system so as to eliminate movable portions on a vertical track, normal inspection can be substantially limited to vertical conveying trucks. These vertical conveying trucks can be dismounted to be inspected and repaired in other places such as a repair factory. Therefore, a low-cost, small-scale vertical conveying apparatus which allows easy maintenance can be realized. Note that the present invention can be applied to a high building so as to realize an apparatus for performing high-speed transportation of a large quantity of articles between a floor near the lowermost floor and a floor near the uppermost floor.

What is claimed is:

1. A vertical conveying apparatus for vertically conveying an article upward and downward between at least two horizontal surfaces having different vertical positions, comprising a plurality of vertical tracks for coupling the horizontal surfaces to each other, vertical conveying trucks capable of vertically moving upward and downward along said vertical tracks, horizontal conveying trucks capable of moving on the horizontal surfaces, and coupling unit means, respectively arranged on the horizontal surfaces, for transferring the article between said vertical conveying trucks and said horizontal conveying trucks, each of said vertical tracks including, throughout its entire length, a primary portion of a linear motor, the primary portion being vertically divided into a plurality of sections, each of which is connected to an independently controlled power source and said vertical conveying truck including a secondary portion of said linear motor.

2. An apparatus according to claim 1, wherein said coupling unit means rotate to transfer articles on the horizontal surfaces.

3. An apparatus according to claim 1, wherein said linear motor comprises a linear induction motor.

4. An apparatus according to claim 1, wherein said power sources connected to different sections of the primary portion of said linear motor have different frequencies.

5. An apparatus according to claim 1, wherein some of said plurality of vertical tracks are connected to power sources which generate a force of a magnitude to provide exclusively ascending movement, and the rest of said plurality of vertical tracks are connected to power sources which generate a force of a magnitude to provide exclusively descending movement.

6. An apparatus according to claim 1, further comprising a plurality of vertical conveying trucks coupled to a single vertical track for travel thereon.

7. An apparatus according to claim 1, wherein said vertical conveying truck is provided with engaging means which is designed to engage with an article to be transferred when said truck moves upward, and to disengage from the article when said truck moves downward.

8. An apparatus according to claim 1, wherein said secondary portion of said linear motor includes at least a first end permanent magnet, a second end permanent magnet and at least one intermediate permanent magnet and wherein said end permanent magnets have a width of one-half of said intermediate permanent magnet.

9. An apparatus according to claim 1, wherein said primary portion of said linear motor includes a primary yoke having a plurality of grooves and a primary winding accommodated in said grooves.

10. An apparatus according to claim 1, wherein said vertical conveying trucks include means for coupling said vertical conveying trucks to said vertical tracks, said means for coupling including a plurality of wheels, at least one wheel including means for restricting lateral movement of said vertical conveying truck.

11. An apparatus according to claim 1, wherein the number of sections in said plurality of sections of said primary portion of each vertical track is greater than or equal to the number of vertical conveying trucks coupled to each of said vertical conveying tracks.

* * * * *